United States Patent Office 3,222,122
Patented Dec. 7, 1965

3,222,122
COMPACTED ALUMINUM-CONTAINING HYDRIDES
Sidney Johnson, Manchester, and Charles H. Lewis, Jr., Danvers, Mass., assignors to Metal Hydrides Incorporated, Beverly, Mass., a company incorporated of Massachusetts
No Drawing. Filed Jan. 19, 1962, Ser. No. 167,407
4 Claims. (Cl. 23—14)

This invention relates to moderating the reactivity of lithium aluminum hydride, sodium aluminum hydride, and other aluminum-containing hydrides with water, alcohols, primary amines, acids, etc. The invention makes possible the utilization of aluminum-containing hydrides for generation of hydrogen by reaction thereof with water.

It is well known that these aluminum-containing hydrides react violently with water, liberating and igniting hydrogen. Contact with liquid water, such as in inadequately dried apparatus, fingerprints, perspiration-soaked gloves, generally causes ignition. Manufacturers have issued bulletins warning of the dangers in their use stating, among other precautions, "The most important safety step is the exclusion of water in all forms." With respect to lithium aluminum hydride which has enjoyed greatest commercial use, D. R. Husted and A. H. Ahlbrecht, J. Am. Chem. Soc., 74, 5422 (1952), advise as follows:

"Lithium aluminum hydride should be ground only under an atmosphere of nitrogen and the powder added to the reaction flask with nitrogen flowing through the system. A minimum of 2 cu. ft./hr. is recommended. This is particularly important during the addition of water to decompose the excess lithium aluminum hydride. The water inlet tube should extend nearly to the surface of the ether solution so no water will strike the walls of the flask where a dried residue of lithium aluminum hydride is sometimes left by splashing of the ether solution and evaporation of the ether. Water striking such a residue causes flashes of flame. Oxygen must be absent to prevent explosions. Lithium aluminum hydride fires should be extinguished by the use of sodium chloride, sand, etc., never by carbon tetrachloride, water or carbon dioxide extinguishers. The use of explosion shields and remote control during the addition of water is recommended strongly."

Although calcium hydride, as well as the alkali metal borohydrides in the presence of catalysts, has been used for generating hydrogen by reaction with water, the aluminum-containing hydrides have not found practical utility for the controlled generation of useful quantities of hydrogen by reaction with water.

The aluminum-containing hydrides, even in lump form, react with water with extreme violence. However, we have discovered that, when properly compacted, the above mentioned aluminum-containing hydrides are extremely useful for the generation of hydrogen by reaction with water. Thus, pellets formed by compacting the aluminum-containing hydrides, with or without a binder such as aluminum stearate, will react with water in standard hydrogen generation equipment to generate hydrogen at a rate comparable to that of calcium hydride. The extent to which the reaction is moderated by compaction of the material is extremely surprising since the mere act of compaction does not adequately moderate the reaction with water of other water-reactive materials. Thus, sodium hydride pellets disintegrate on contact with water and react with violence. Sodium metal, even in massive form, interacts with water with explosive violence.

In accordance with the present invention, the reactivity of an aluminum-containing hydride is moderated to reduce substantially its rate of reaction with water, alcohols, primary amines, acids, etc. by compacting the hydride under heavy pressure to form a compacted or pelleted material. A pressure of the order of 14,000 to 72,000 pounds per square inch has been found suitable. The compacted material may be defined as one having a green strength not greater than about 5 as determined by the "Rattler" test. Alternatively, the compacted material may be defined as having a density of not less than 65 percent of the theoretical density of the aluminum-containing hydride. While a binder, such as aluminum stearate, may be mixed with the aluminum-containing hydride, we prefer to form the compacted material in the absence of a binder.

The compacted aluminum-containing hydrides of the invention may be used for any application where it is desired to moderate the high reactivity of these substances. They may be used for hydrogen generation by reaction with water in essentially the same manner in which calcium hydride has been used heretofore. We have found sodium aluminum hydride and lithium aluminum hydride particularly suitable for use in the practice of the invention. However, the other alkali metal aluminum hydrides, the alkaline earth metal aluminum hydrides, such as calcium and magnesium aluminum hydrides, and aluminum hydride and its various Lewis base complexes, such as the etherates of diethyl ether, tetrahydrofuran, etc., may be used but are not available on a commercial scale.

The "Rattler" test for green strength referred to hereinbefore is the test prescribed by the Metal Powder Association, M.P.A. Standard 15–51T. This test comprises forming small pellets by subjecting the material to desired pressure. These pellets are weighed and placed in a 20 mesh copper screen drum with a 1 inch copper baffle and the drum rotated 1000 revolutions at 87 revolutions per minute. The pellets are removed from the drum and weighed to determine the weight loss which in turn is divided by the original weight and multiplied by 100 which gives the green strength as percent weight loss. As illustrative, pellets of lithium aluminum hydride and sodium aluminum hydride each 0.5 inch in diameter and 0.25 inch thick were prepared by subjecting the material to pressure as indicated in the following table and their green strength determined as above described. Their green strength is shown in the following table.

| Pellet Composition | Pressure in P.S.I. | Green Strength |
|---|---|---|
| $LiAlH_4$ | 14,400 | 4.336 |
| $LiAlH_4$ | 28,800 | 3.862 |
| $LiAlH_4$ | 72,000 | 3.490 |
| $NaAlH_4$ | 14,400 | 1.866 |
| $NaAlH_4$ | 28,800 | 1.674 |
| $NaAlH_4$ | 72,000 | 0.9115 |

The invention is illustrated further by several hydrogen generation runs, the results of which are shown in the following table. These runs illustrate that a compacted aluminum-containing hydride has a water activity comparable to calcium hydride. In these runs standard hydrogen generation equipment was used comprising a cylindrical can for receiving the hydride charge adapted to be attached to the recessed bottom of a cylindrical generator of slightly larger diameter, the bottom of the generator being provided with a plurality of holes to permit water to pass into the generator and thence into the charge can through holes provided in the top of the latter. The top of the generator was provided with a gas outlet tube which was connected by a hose to a wet test meter. In each run the charge indicated in the table was placed in the charge can and the latter attached to the bottom of the generator. The thus assembled charge can and generator was immersed in water so that the water level was nearly at the top of the generator.

| Run | Charge | Weight of Charge in Grams | H₂ evolved Cu. ft. (STP) | Time (min.) to Complete Reaction | H₂ yield (percent) |
|---|---|---|---|---|---|
| 1 | CaH₂ | 1188 | 42.5 | 20 | 100 |
| 2 | LiAlH₄ | 530 | 40.8 | 30 | 97 |
| 3 | LiAlH₄ | 530 | 40.0 | 25 | 95 |
| 4 | LiAlH₄ | 530 | 42.5 | 28 | 100 |

In the above table the calcium hydride used was in the form of crushed rod having a purity of 94 percent. The lithium aluminum hydride used was in the form of pellets havin a purity of 95 percent and a green strength of about 4.0.

We claim:

1. A compacted aluminum-containing hydride having a density of not less than about 65 percent of the theoretical density of the aluminum-containing hydride produced by compaction under a pressure between about 14,000 and 72,000 pounds per square inch, said aluminum-containing hydride being selected from the group consisting of alkali metal aluminum hydrides, alkaline earth metal aluminum hydrides, aluminum hydride, and Lewis base complexes of aluminum hydride.

2. A compacted lithium aluminum hydride having a density not less than about 65 percent of the theoretical density of lithium aluminum hydride produced by compaction under a pressure between about 14,000 and 72,000 pounds per square inch.

3. A compacted sodium aluminum hydride having a density not less than about 65 percent of the theoretical density of sodium aluminum hydride produced by compaction under a pressure between about 14,000 and 72,000 pounds per square inch.

4. A compacted magnesium aluminum hydride having a density not less than about 65 percent of the theoretical density of magnesium aluminum hydride produced by compaction under a pressure between about 14,000 and 72,000 pounds per square inch.

References Cited by the Examiner
UNITED STATES PATENTS

| | | | |
|---|---|---|---|
| 2,567,972 | 9/1951 | Schlesinger | 23—14 |
| 3,112,989 | 12/1963 | Banus | 23—14 |

OTHER REFERENCES

Finholt et al.: article in Journal of Inorganic and Nuclear Chemistry, vol. 1 (1955), page 320.

Finholt et al.: article in Journal of the American Chemical Society, vol. 69 (1947), page 1201.

Hurd: Chemistry of the Hydrides, John Wiley & Sons (1952), page 51.

MAURICE A. BRINDISI, *Primary Examiner.*